(12) United States Patent
    Durkee

(10) Patent No.: US 9,291,320 B2
(45) Date of Patent: Mar. 22, 2016

(54) CONSOLIDATED TROFFER

(71) Applicant: Cree, Inc., Durham, NC (US)

(72) Inventor: John Durkee, Raleigh, NC (US)

(73) Assignee: Cree, Inc., Durham, NC (US)

( * ) Notice: Subject to any disclaimer, the term of this patent is extended or adjusted under 35 U.S.C. 154(b) by 9 days.

(21) Appl. No.: 14/015,801

(22) Filed: Aug. 30, 2013

(65) Prior Publication Data

US 2014/0211496 A1    Jul. 31, 2014

Related U.S. Application Data

(63) Continuation-in-part of application No. 13/839,949, filed on Mar. 15, 2013, and a continuation-in-part of application No. 13/840,563, filed on Mar. 15, 2013, and a continuation-in-part of application No. 13/841,074, filed on Mar. 15, 2013, and a continuation-in-part of application No. 13/842,521, filed on Mar. 15, 2013, and a continuation-in-part of application No. 13/841,651, filed on Mar. 15, 2013, now Pat. No. 9,091,417, and a continuation-in-part of application No. 13/842,557, filed on Mar. 15, 2013, now Pat. No. 9,062,869.

(60) Provisional application No. 61/758,660, filed on Jan. 30, 2013.

(51) Int. Cl.
    *F21V 5/04*     (2006.01)
    *F21V 8/00*     (2006.01)
    *F21S 13/02*    (2006.01)
    *F21S 8/04*     (2006.01)
    *F21V 7/00*     (2006.01)
    *G02B 6/00*     (2006.01)
    *F21Y 101/02*   (2006.01)
    *F21Y 103/02*   (2006.01)

(52) U.S. Cl.
    CPC ............... *F21S 8/04* (2013.01); *F21V 7/0008* (2013.01); *G02B 6/00* (2013.01); *F21Y 2101/02* (2013.01); *F21Y 2103/022* (2013.01)

(58) Field of Classification Search
    CPC .......... F21S 8/04–8/068; F21V 21/02–21/049
    See application file for complete search history.

(56) References Cited

U.S. PATENT DOCUMENTS

615,108 A    11/1898   De Segundo
766,515 A    8/1904    Northrup (Continued)

FOREIGN PATENT DOCUMENTS

DE    20014114    12/2000
DE    20107425    7/2001

(Continued)

OTHER PUBLICATIONS

Iijima et al., "Document Scanner Using Polymer Waveguides With a Microlens Array," Optical Engineering, vol. 41, Issue 11, pp. 2743-2748, Oct. 28, 2002 (4 pages).

(Continued)

*Primary Examiner* — Mariceli Santiago
(74) *Attorney, Agent, or Firm* — McCracken & Gillen LLC

(57) ABSTRACT

A dropped-ceiling lighting system having a reflector positioned in an opening in a grid used to suspend a dropped ceiling, a lighting device including a light source mounted adjacent to the reflector, a structural support securing the lighting device to the grid, and a power source for the lighting device. Also discloses is a dropped-ceiling lighting system comprised of a reflector attached to a plenum barrier positioned in an opening in a grid used to suspend a dropped ceiling, a power source extends from a first edge of the plenum barrier to a second edge of the plenum barrier, and a light source is mounted to the power source.

31 Claims, 13 Drawing Sheets

(56) References Cited

U.S. PATENT DOCUMENTS

| | | |
|---|---|---|
| D67,806 S | 7/1925 | Hoyt et al. |
| 2,043,951 A | 6/1936 | Eksergian |
| 2,992,587 A | 4/1958 | Hicks, Jr. et al. |
| 3,372,740 A | 3/1968 | Kastovich et al. |
| 3,532,871 A | 10/1970 | Shipman |
| D219,546 S | 12/1970 | Kaiser et al. |
| 4,146,297 A | 3/1979 | Alferness et al. |
| 4,441,787 A | 4/1984 | Lichtenberger |
| 4,714,983 A | 12/1987 | Lang |
| D298,861 S | 12/1988 | Ewing et al. |
| 4,954,930 A | 9/1990 | Maegawa et al. |
| 4,977,486 A | 12/1990 | Gotoh |
| 5,005,108 A | 4/1991 | Pristash |
| 5,009,483 A | 4/1991 | Rockwell, III |
| 5,026,161 A | 6/1991 | Werner |
| 5,040,098 A | 8/1991 | Tanaka et al. |
| 5,047,761 A | 9/1991 | Sell |
| 5,061,404 A | 10/1991 | Wu et al. |
| 5,097,258 A | 3/1992 | Iwaki |
| 5,113,177 A | 5/1992 | Cohen |
| 5,113,472 A | 5/1992 | Gualtieri et al. |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | DuNah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,657,408 A | 8/1997 | Ferm et al. |
| 5,658,066 A | 8/1997 | Hirsch |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa |
| 5,999,281 A | 12/1999 | Abbott et al. |
| 5,999,685 A | 12/1999 | Goto et al. |
| 6,002,829 A | 12/1999 | Winston et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |
| 6,097,549 A | 8/2000 | Jenkins et al. |
| 6,134,092 A | 10/2000 | Pelka et al. |
| 6,139,176 A | 10/2000 | Hulse et al. |
| 6,151,089 A | 11/2000 | Yang et al. |
| 6,155,692 A | 12/2000 | Ohkawa |
| 6,155,693 A | 12/2000 | Spiegel et al. |
| 6,161,939 A * | 12/2000 | Bansbach .................... 362/223 |
| 6,164,790 A | 12/2000 | Lee |
| 6,164,791 A | 12/2000 | Gwo-Juh et al. |
| 6,167,182 A | 12/2000 | Shinohara et al. |
| 6,185,357 B1 | 2/2001 | Zou et al. |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| 6,304,693 B1 | 10/2001 | Buelow, II et al. |
| 6,310,704 B1 | 10/2001 | Dogan et al. |
| 6,379,016 B1 | 4/2002 | Boyd et al. |
| 6,379,017 B2 | 4/2002 | Nakabayashi et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang et al. |
| 6,485,157 B2 | 11/2002 | Ohkawa |
| 6,508,563 B2 | 1/2003 | Parker et al. |
| 6,523,986 B1 | 2/2003 | Hoffmann |
| 6,536,921 B1 | 3/2003 | Simon |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,637,924 B2 | 10/2003 | Pelka et al. |
| 6,647,199 B1 | 11/2003 | Pelka et al. |
| 6,652,109 B2 | 11/2003 | Nakamura |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,755,556 B2 | 6/2004 | Gasquet et al. |
| 6,758,582 B1 | 7/2004 | Hsiao et al. |

(56) References Cited

U.S. PATENT DOCUMENTS

| | | |
|---|---|---|
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,845,212 B2 | 1/2005 | Gardiner et al. |
| 6,854,857 B2 | 2/2005 | Hara et al. |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |
| 6,974,241 B2 | 12/2005 | Hara et al. |
| 6,992,335 B2 | 1/2006 | Ohkawa |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,111,969 B2 | 9/2006 | Bottesch et al. |
| 7,118,253 B1 | 10/2006 | Simon |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,178,946 B2 | 2/2007 | Saccomanno et al. |
| 7,182,480 B2 | 2/2007 | Kan |
| 7,192,174 B2 | 3/2007 | Myoung |
| 7,195,374 B2 | 3/2007 | Saccomanno et al. |
| 7,204,634 B2 | 4/2007 | Chen et al. |
| 7,209,628 B2 | 4/2007 | Winston et al. |
| 7,222,995 B1 | 5/2007 | Bayat et al. |
| 7,223,004 B2 | 5/2007 | Chen et al. |
| 7,246,931 B2 | 7/2007 | Hsieh et al. |
| 7,258,467 B2 | 8/2007 | Saccomanno et al. |
| 7,265,800 B2 | 9/2007 | Jagt et al. |
| 7,273,299 B2 | 9/2007 | Parkyn et al. |
| 7,290,906 B2 | 11/2007 | Suzuki et al. |
| 7,292,767 B2 | 11/2007 | Cheng |
| 7,364,342 B2 | 4/2008 | Parker et al. |
| 7,369,918 B2 | 5/2008 | Cosgrove |
| 7,393,124 B1 | 7/2008 | Williams |
| 7,399,108 B2 | 7/2008 | Ayabe et al. |
| 7,400,809 B2 | 7/2008 | Erben et al. |
| 7,404,660 B2 | 7/2008 | Parker |
| 7,422,357 B1 | 9/2008 | Chang |
| 7,455,416 B2 | 11/2008 | Chen |
| 7,458,714 B2 | 12/2008 | Chang |
| 7,465,074 B2 | 12/2008 | Blumel |
| 7,486,854 B2 | 2/2009 | Van Ostrand et al. |
| 7,488,093 B1 | 2/2009 | Huang et al. |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,193 B2 | 12/2009 | Chang |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| 7,654,719 B2 | 2/2010 | Chang |
| 7,663,804 B2 | 2/2010 | Chang |
| 7,674,018 B2 | 3/2010 | Holder et al. |
| 7,696,531 B2 | 4/2010 | Miyao |
| 7,703,950 B2 | 4/2010 | Ewert et al. |
| 7,703,967 B2 | 4/2010 | Parker |
| 7,710,663 B2 | 5/2010 | Barnes et al. |
| 7,722,224 B1 | 5/2010 | Coleman et al. |
| 7,722,241 B1 | 5/2010 | Chang |
| 7,724,321 B2 | 5/2010 | Hsieh et al. |
| 7,730,967 B2 | 6/2010 | Ballantyne et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| 7,766,515 B2 | 8/2010 | Condon et al. |
| 7,771,087 B2 | 8/2010 | Wilcox et al. |
| 7,775,697 B2 | 8/2010 | Hirano et al. |
| 7,776,236 B2 | 8/2010 | Shih et al. |
| 7,780,306 B2 | 8/2010 | Hoshi |
| 7,784,954 B1 | 8/2010 | Coleman |
| 7,798,695 B2 | 9/2010 | Parker |
| 7,806,581 B2 | 10/2010 | Lee |
| 7,810,949 B2 | 10/2010 | Chang |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| 7,826,698 B1 | 11/2010 | Meir et al. |
| 7,845,826 B2 | 12/2010 | Aylward et al. |
| 7,850,357 B2 | 12/2010 | Kim et al. |
| 7,857,487 B2 | 12/2010 | Wu et al. |
| 7,857,619 B2 | 12/2010 | Liu |
| 7,866,871 B2 | 1/2011 | Couzin et al. |
| 7,905,646 B2 | 3/2011 | Adachi et al. |
| 7,907,804 B2 | 3/2011 | Meir et al. |
| 7,909,496 B2 | 3/2011 | Matheson et al. |
| 7,914,192 B2 | 3/2011 | Coleman |
| 7,914,193 B2 | 3/2011 | Peifer et al. |
| 7,914,196 B2 | 3/2011 | Parker et al. |
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| 7,970,246 B2 | 6/2011 | Travis et al. |
| 7,976,204 B2 | 7/2011 | Li et al. |
| 7,991,257 B1 | 8/2011 | Coleman |
| 7,997,784 B2 | 8/2011 | Tsai |
| 8,002,450 B2 | 8/2011 | Van Ostrand et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,696 B2 | 11/2011 | Ijzerman et al. |
| 8,052,316 B2 | 11/2011 | Lee |
| 8,054,409 B2 | 11/2011 | Hsieh et al. |
| 8,057,056 B2 | 11/2011 | Zhu et al. |
| 8,061,877 B2 | 11/2011 | Chang |
| 8,064,743 B2 | 11/2011 | Meir et al. |
| 8,067,884 B2 | 11/2011 | Li |
| 8,070,345 B2 | 12/2011 | Zhang et al. |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| 8,189,973 B2 | 5/2012 | Travis et al. |
| 8,192,051 B2 | 6/2012 | Dau et al. |

(56) References Cited

U.S. PATENT DOCUMENTS

| | | |
|---|---|---|
| 8,198,109 B2 | 6/2012 | Lerman et al. |
| 8,210,716 B2 | 7/2012 | Lerman et al. |
| 8,212,263 B2 | 7/2012 | Bierhuizen et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| 8,277,106 B2 | 10/2012 | Van Gorkom et al. |
| 8,282,261 B2 | 10/2012 | Pance et al. |
| 8,282,853 B2 | 10/2012 | Mori et al. |
| 8,283,354 B2 | 10/2012 | Wilson et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 | 10/2012 | Coushaine et al. |
| 8,297,818 B2 | 10/2012 | Richardson |
| 8,301,002 B2 | 10/2012 | Shani |
| 8,310,158 B2 | 11/2012 | Coplin et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmermann |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,348,489 B2 | 1/2013 | Holman et al. |
| 8,351,744 B2 | 1/2013 | Travis et al. |
| 8,353,606 B2 | 1/2013 | Jeong |
| 8,369,678 B2 | 2/2013 | Chakmakjian et al. |
| 8,371,735 B2 | 2/2013 | Chen et al. |
| 8,376,582 B2 | 2/2013 | Catone et al. |
| 8,382,354 B2 | 2/2013 | Kim et al. |
| 8,382,387 B1 | 2/2013 | Sandoval |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shiau et al. |
| 8,434,892 B2 | 5/2013 | Zwak et al. |
| 8,434,893 B2 | 5/2013 | Boyer et al. |
| 8,434,913 B2 | 5/2013 | Vissenberg et al. |
| 8,434,914 B2 | 5/2013 | Li et al. |
| 8,449,128 B2 | 5/2013 | Ko et al. |
| 8,449,142 B1 | 5/2013 | Martin et al. |
| 8,454,218 B2 | 6/2013 | Wang et al. |
| 8,461,602 B2 | 6/2013 | Lerman et al. |
| 8,469,559 B2 | 6/2013 | Williams |
| 8,475,010 B2 | 7/2013 | Vissenberg et al. |
| 8,482,186 B2 | 7/2013 | Wang et al. |
| 8,485,684 B2 | 7/2013 | Lou et al. |
| 8,506,112 B1 | 8/2013 | Dau et al. |
| 8,511,868 B2 | 8/2013 | Haugaard et al. |
| 8,534,896 B2 | 9/2013 | Boonekamp |
| 8,534,901 B2 | 9/2013 | Panagotacos et al. |
| 8,541,795 B2 | 9/2013 | Keller et al. |
| 8,547,022 B2 | 10/2013 | Summerford et al. |
| 8,567,983 B2 | 10/2013 | Boyer et al. |
| 8,567,986 B2 | 10/2013 | Szprengiel et al. |
| 8,573,823 B2 | 11/2013 | Dau et al. |
| 8,585,253 B2 | 11/2013 | Duong et al. |
| 8,591,072 B2 | 11/2013 | Shani et al. |
| 8,591,090 B2 | 11/2013 | Lin |
| 8,593,070 B2 | 11/2013 | Wang et al. |
| 8,598,778 B2 | 12/2013 | Allen et al. |
| 8,602,586 B1 | 12/2013 | Dau et al. |
| 8,608,351 B2 | 12/2013 | Peifer |
| 8,618,735 B2 | 12/2013 | Coplin et al. |
| 8,632,214 B1 | 1/2014 | Tickner et al. |
| 8,641,219 B1 | 2/2014 | Johnson et al. |
| 8,657,479 B2 | 2/2014 | Morgan et al. |
| 8,696,173 B2 | 4/2014 | Urtiga et al. |
| 8,702,281 B2 | 4/2014 | Okada et al. |
| 8,724,052 B2 | 5/2014 | Hsieh et al. |
| 8,740,440 B2 | 6/2014 | Mizuno et al. |
| 8,755,005 B2 | 6/2014 | Bierhuizen et al. |
| 8,770,821 B2 | 7/2014 | Ijzerman et al. |
| 8,780,299 B2 | 7/2014 | Ryu et al. |
| 8,833,999 B2 | 9/2014 | Wang et al. |
| 8,840,276 B2 | 9/2014 | Shani et al. |
| 8,851,712 B2 | 10/2014 | Shani et al. |
| 8,864,360 B2 | 10/2014 | Parker et al. |
| 8,870,431 B2 | 10/2014 | Lin et al. |
| 8,882,323 B2 | 11/2014 | Solomon et al. |
| 8,905,569 B2 | 12/2014 | Thomas et al. |
| 8,915,611 B2 | 12/2014 | Zhang |
| 8,917,962 B1 | 12/2014 | Nichol et al. |
| 8,950,919 B2 | 2/2015 | Chen |
| 8,960,969 B2 | 2/2015 | Freund |
| 9,046,225 B2 | 6/2015 | Meyers et al. |
| 2001/0019479 A1 | 9/2001 | Nakabayashi et al. |
| 2002/0061178 A1 | 5/2002 | Winston et al. |
| 2002/0172039 A1 | 11/2002 | Inditsky |
| 2003/0034985 A1 | 2/2003 | Needham Riddle et al. |
| 2003/0146688 A1 | 8/2003 | Kitazawa et al. |
| 2004/0008952 A1 | 1/2004 | Kragl |
| 2004/0080938 A1 | 4/2004 | Holman et al. |
| 2004/0135933 A1 | 7/2004 | Leu et al. |
| 2004/0213003 A1* | 10/2004 | Lauderdale et al. .......... 362/404 |
| 2004/0240217 A1 | 12/2004 | Rice |
| 2005/0111235 A1 | 5/2005 | Suzuki et al. |
| 2005/0201103 A1 | 9/2005 | Saccomanno et al. |
| 2005/0210643 A1 | 9/2005 | Mezei et al. |
| 2005/0286251 A1 | 12/2005 | Smith |
| 2006/0002146 A1 | 1/2006 | Baba |
| 2006/0072203 A1 | 4/2006 | Lee |
| 2006/0076568 A1 | 4/2006 | Keller et al. |
| 2006/0187651 A1 | 8/2006 | Kim et al. |
| 2006/0262521 A1 | 11/2006 | Piepgras et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0189033 A1 | 8/2007 | Watanabe et al. |
| 2007/0223247 A1 | 9/2007 | Lee et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2008/0037284 A1 | 2/2008 | Rudisill |
| 2008/0094853 A1 | 4/2008 | Kim et al. |
| 2008/0137695 A1 | 6/2008 | Takahashi et al. |
| 2008/0186273 A1 | 8/2008 | Krijn et al. |
| 2008/0192458 A1 | 8/2008 | Li |
| 2008/0199143 A1 | 8/2008 | Turner |
| 2008/0266879 A1 | 10/2008 | Chang |
| 2008/0266901 A1 | 10/2008 | Chang |
| 2009/0027893 A1 | 1/2009 | Chang |
| 2009/0091948 A1 | 4/2009 | Wang et al. |
| 2009/0103293 A1 | 4/2009 | Harbers et al. |
| 2009/0196071 A1 | 8/2009 | Matheson et al. |

(56) References Cited

U.S. PATENT DOCUMENTS

| | | |
|---|---|---|
| 2009/0257242 A1 | 10/2009 | Wendman |
| 2009/0297090 A1 | 12/2009 | Bogner et al. |
| 2009/0309494 A1 | 12/2009 | Patterson et al. |
| 2009/0310367 A1 | 12/2009 | Kuo |
| 2009/0316414 A1* | 12/2009 | Yang et al. ............... 362/296.01 |
| 2010/0008088 A1 | 1/2010 | Koizumi et al. |
| 2010/0027257 A1 | 2/2010 | Boonekamp et al. |
| 2010/0046219 A1 | 2/2010 | Pijlman et al. |
| 2010/0053959 A1 | 3/2010 | Ijzerman et al. |
| 2010/0073597 A1 | 3/2010 | Bierhuizen et al. |
| 2010/0079843 A1 | 4/2010 | Derichs et al. |
| 2010/0079980 A1 | 4/2010 | Sakai |
| 2010/0110673 A1* | 5/2010 | Bergman et al. ............... 362/231 |
| 2010/0118531 A1 | 5/2010 | Montagne |
| 2010/0128483 A1 | 5/2010 | Reo et al. |
| 2010/0133422 A1 | 6/2010 | Lin et al. |
| 2010/0157577 A1 | 6/2010 | Montgomery et al. |
| 2010/0208460 A1 | 8/2010 | Ladewig et al. |
| 2010/0220484 A1 | 9/2010 | Shani et al. |
| 2010/0220497 A1* | 9/2010 | Ngai ............................. 362/610 |
| 2010/0231143 A1 | 9/2010 | May et al. |
| 2010/0238645 A1 | 9/2010 | Bailey |
| 2010/0238671 A1 | 9/2010 | Catone et al. |
| 2010/0246158 A1* | 9/2010 | Van Gorkom et al. .......... 362/19 |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0315833 A1 | 12/2010 | Holman et al. |
| 2010/0320904 A1 | 12/2010 | Meir |
| 2010/0328936 A1 | 12/2010 | Pance et al. |
| 2011/0007505 A1 | 1/2011 | Wang et al. |
| 2011/0013397 A1 | 1/2011 | Catone et al. |
| 2011/0013420 A1 | 1/2011 | Coleman et al. |
| 2011/0037388 A1 | 2/2011 | Lou et al. |
| 2011/0044582 A1 | 2/2011 | Travis et al. |
| 2011/0051457 A1* | 3/2011 | Chen ............................. 362/607 |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063855 A1 | 3/2011 | Vissenberg |
| 2011/0069843 A1 | 3/2011 | Cohen |
| 2011/0122616 A1 | 5/2011 | Hochstein |
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0180818 A1 | 7/2011 | Lerman et al. |
| 2011/0187273 A1 | 8/2011 | Summerford et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0248287 A1 | 10/2011 | Yuan et al. |
| 2011/0249467 A1 | 10/2011 | Boonekamp |
| 2011/0261570 A1 | 10/2011 | Okada et al. |
| 2011/0273079 A1 | 11/2011 | Pickard et al. |
| 2011/0273882 A1 | 11/2011 | Pickard |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0014128 A1 | 1/2012 | Lin |
| 2012/0026728 A1 | 2/2012 | Lou et al. |
| 2012/0026828 A1 | 2/2012 | Fjellstad et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0068615 A1 | 3/2012 | Duong et al. |
| 2012/0069575 A1 | 3/2012 | Koh et al. |
| 2012/0069579 A1 | 3/2012 | Koh et al. |
| 2012/0069595 A1 | 3/2012 | Catalano |
| 2012/0113676 A1 | 5/2012 | Van Dijk et al. |
| 2012/0114284 A1 | 5/2012 | Ender |
| 2012/0120651 A1 | 5/2012 | Peck |
| 2012/0140461 A1 | 6/2012 | Pickard |
| 2012/0147624 A1* | 6/2012 | Li et al. ......................... 362/609 |
| 2012/0152490 A1 | 6/2012 | Wen et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Petcavich et al. |
| 2012/0188774 A1 | 7/2012 | Okada |
| 2012/0212957 A1 | 8/2012 | Hyun et al. |
| 2012/0230019 A1 | 9/2012 | Peifer |
| 2012/0242930 A1 | 9/2012 | Ryu et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0298181 A1 | 11/2012 | Cashion et al. |
| 2012/0320626 A1 | 12/2012 | Quilici et al. |
| 2012/0326614 A1 | 12/2012 | Tsuji et al. |
| 2013/0003409 A1* | 1/2013 | Vissenberg et al. ........... 362/606 |
| 2013/0010464 A1 | 1/2013 | Shuja et al. |
| 2013/0028557 A1 | 1/2013 | Lee et al. |
| 2013/0033867 A1 | 2/2013 | Coplin et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0039090 A1* | 2/2013 | Dau et al. ...................... 362/551 |
| 2013/0044480 A1 | 2/2013 | Sato et al. |
| 2013/0077298 A1 | 3/2013 | Steele et al. |
| 2013/0107518 A1 | 5/2013 | Boyer et al. |
| 2013/0107527 A1 | 5/2013 | Boyer et al. |
| 2013/0107528 A1 | 5/2013 | Boyer et al. |
| 2013/0128593 A1 | 5/2013 | Luo |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0071687 A1 | 3/2014 | Tickner et al. |
| 2014/0168955 A1 | 6/2014 | Gershaw |
| 2014/0211457 A1 | 7/2014 | Tarsa et al. |
| 2014/0211462 A1 | 7/2014 | Keller et al. |
| 2014/0211476 A1 | 7/2014 | Yuan et al. |
| 2014/0211495 A1 | 7/2014 | Yuan et al. |
| 2014/0211497 A1 | 7/2014 | Yuan et al. |
| 2014/0211502 A1 | 7/2014 | Keller et al. |
| 2014/0211503 A1 | 7/2014 | Tarsa |
| 2014/0211504 A1 | 7/2014 | Yuan et al. |
| 2014/0211508 A1 | 7/2014 | Yuan et al. |
| 2014/0212090 A1 | 7/2014 | Wilcox et al. |
| 2014/0268879 A1 | 9/2014 | Mizuyama et al. |
| 2014/0334126 A1 | 11/2014 | Speier et al. |
| 2014/0355297 A1 | 12/2014 | Castillo et al. |
| 2014/0355302 A1 | 12/2014 | Wilcox et al. |

(56) References Cited

U.S. PATENT DOCUMENTS

| | | |
|---|---|---|
| 2015/0003059 A1 | 1/2015 | Haitz et al. |
| 2015/0049507 A1 | 2/2015 | Shani et al. |
| 2015/0109820 A1 | 4/2015 | Wilcox et al. |

FOREIGN PATENT DOCUMENTS

| | | |
|---|---|---|
| DE | 10047101 | 5/2002 |
| DE | 10203106 | 7/2003 |
| DE | 10302563 | 7/2004 |
| DE | 10302564 | 7/2004 |
| DE | 102006009325 | 9/2007 |
| DE | 102006011296 | 9/2007 |
| DE | 102006013343 | 9/2007 |
| JP | H10173870 | 6/1998 |
| JP | 2000/147264 | 5/2000 |
| JP | 2004/227934 A | 8/2004 |
| JP | 3093080 | 12/2005 |
| JP | 2006/131444 | 5/2006 |
| JP | 2006/0221922 A | 8/2006 |
| JP | 2007/123130 A | 5/2007 |
| WO | WO 96/21122 | 7/1996 |
| WO | WO 96/21884 | 7/1996 |
| WO | WO 99/4531 | 1/1999 |
| WO | WO 03/031869 | 4/2003 |
| WO | WO 2009/012484 | 1/2009 |
| WO | WO 2011/130648 | 10/2011 |
| WO | WO 2013/078463 | 5/2013 |
| WO | WO 2013/082537 | 6/2013 |
| WO | WO 2014120672 A2 | 8/2014 |
| WO | WO 2014120672 A3 | 9/2014 |

OTHER PUBLICATIONS

Ji et al., "Electrically Controllable Microlens Array Fabricated by Anisotropic Phase Separation From Liquid-Crystal and Polymer Composite Materials," vol. 28, No. 13, Optics Letters, pp. 1147-1149, Jul. 1, 2003 (4 pages).

International Search Report and Written Opinion for International Application No. PCT/US2014/013400, Applicant, Cree, Inc. (21 pages).

Invitation to Pay Additional Fees for International Application No. PCT/US2014/013400, Applicant, Cree, Inc. (2 pages).

Web page at http://www.fusionoptix.com/lighting/components/array-optics.htm, printed May 9, 2013 (2 pages).

U.S. Appl. No. 13/657,421, filed Oct. 22, 2012 (38 pages).

Web page at http://www.oluce.com/en/lamps/table/colombo-281-detail, printed Nov. 19, 2013 (2 pages).

Drain, Kieran, "Transformations in Lighting: 2011 DOE Solid-State Lighting R&D Workshop, Panel 3: Novel Lighting Concepts for Large Interior Spaces," PowerPoint presentation printed Nov. 2013 (23 pages).

\* cited by examiner

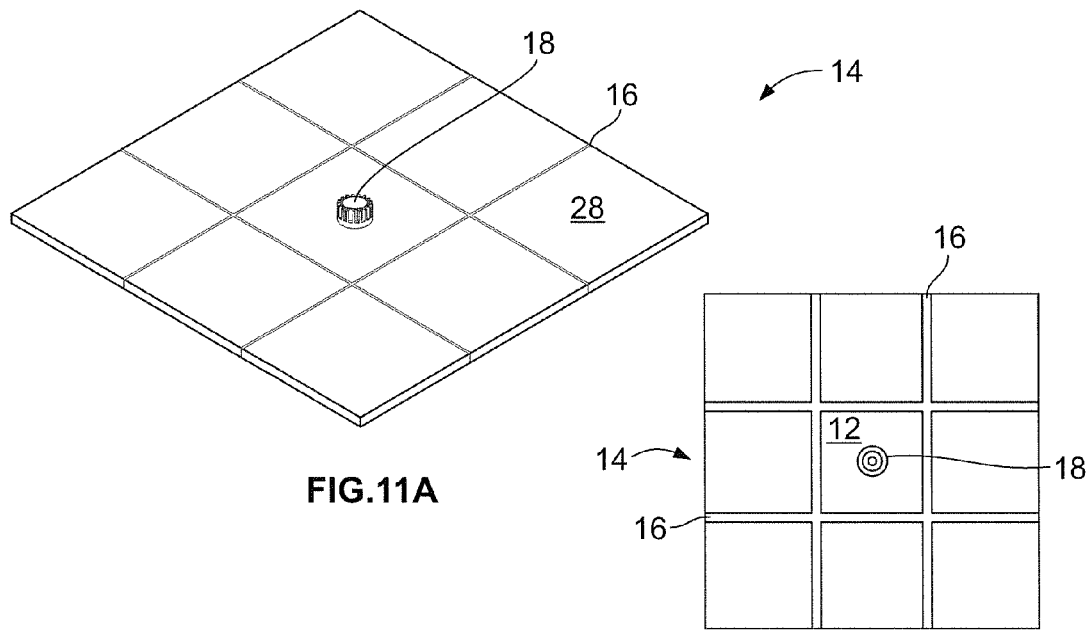
FIG.11A
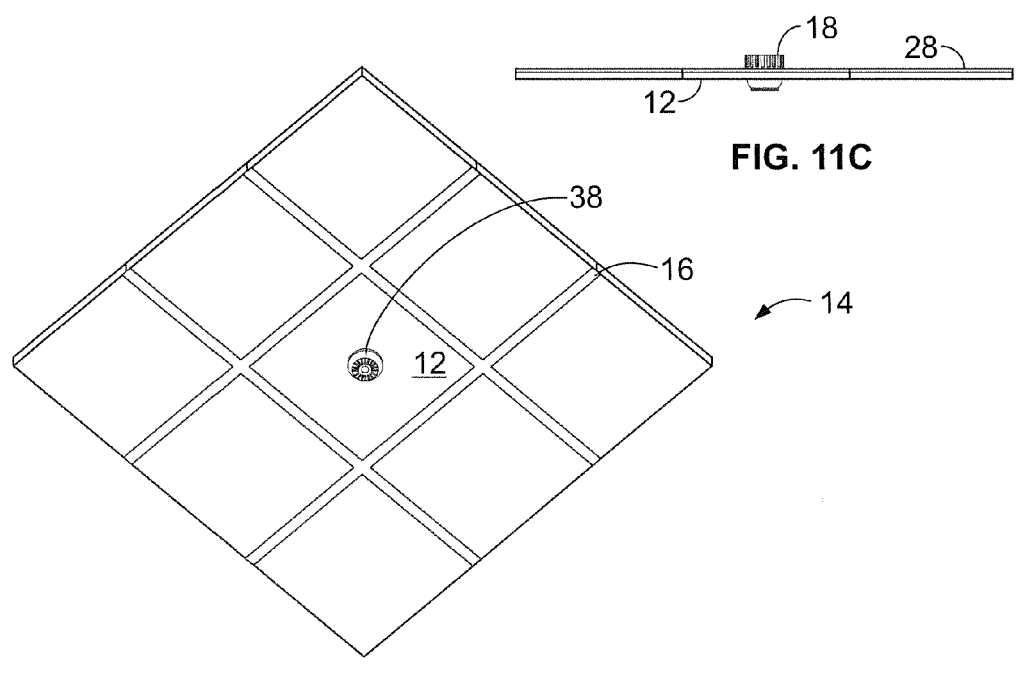
FIG. 11D
FIG. 11C
FIG. 11B

CONSOLIDATED TROFFER

CROSS-REFERENCE TO RELATED PATENT APPLICATIONS

This patent application claims the benefit of U.S. Provisional Patent Application Ser. No. 61/758,660, filed, Jan. 30, 2013, and is a continuation-in-part of U.S. patent application Ser. No. 13/839,949, filed, Mar. 15, 2013, U.S. patent application Ser. No. 13/840,563, filed, Mar. 15, 2013, U.S. patent application Ser. No. 13/841,074, filed, Mar. 15, 2013, U.S. patent application Ser. No. 13/842,521, filed, Mar. 15, 2013, U.S. patent application Ser. No. 13/841,651, filed, Mar. 15, 2013, and U.S. patent application Ser. No. 13/842,557, filed Mar. 15, 2013 and incorporates the disclosures of such applications by reference herein.

FIELD OF THE INVENTION

This invention pertains to a lighting system and, in particular, for a light emitting diode (LED) lighting system.

BACKGROUND OF THE INVENTION

Lighting systems have traditionally involved the use of incandescent or fluorescent lighting. Recent advances in the use of light emitting diodes has, however, resulted in greater use of LEDs for not only display and accent lighting but interior lighting as well. With the use of LEDs comes the problem of how to disperse the concentrated light ray of the LED so as to create a more uniform and comfortable lighting environment. In addition to developing ways to disperse the LED lighting, there is also a need to improve lighting systems for use with a dropped ceiling in order to meet regulatory restrictions that deal with dropped-ceiling mounted luminaires.

Some of the more difficult regulatory restrictions to deal with involve the fact that the entire barrier between plenum space and occupied space must be bounded by an approved structural and fire rated material. Additionally, the system must be strong enough to support a load greater than its own weight, and must be anchored against earthquake, physical strikes and vibration. Furthermore, any potentially dangerous electrical components, including LED power sources must be isolated from any interaction with nearby materials or occupants. Finally, the amount of light, and the distribution of light into the occupied space is fairly static and defined by the space to be lit. Therefore, any reduction in the size of the luminous source will result in a brighter and higher glare appearance. The entire ceiling grid area, however, must glow uniformly in order to create the highest visual comfort. Finally, the luminous appearance of the energized lighting system must be visually comfortable. Also, the luminous area of the lighting system must be made as large as possible to reduce its contrast with the surrounding ceiling tiles.

Previous lighting systems for use with a dropped ceiling have involved the use of fluorescent lighting. For example, U.S. Pat. No. 5,777,857 (Degelmann) is directed to an energy efficient lighting system for use with T8 fluorescent tubes. Given the regulatory restrictions and the need to create a comfortable lighting environment using LEDs, a dropped-ceiling lighting system that would satisfy the regulatory requirements and provide for uniform lighting would be an important improvement in the art.

BRIEF SUMMARY OF THE INVENTION

Disclosed is a lighting system that comprises a support element having a reflective surface with a luminaire mounted on the support element. The luminaire comprises an LED light source that provides light in a first pattern and a waveguide redirection element comprising an inner portion and an outer portion having an emission surface disposed adjacent and at an oblique angle with respect to the inner portion. The outer portion comprises an end having a first thickness adapted to receive light and an outer edge opposite the end having a second thickness less than the first thickness. The outer portion of the waveguide redirection element further comprises a third surface opposite the emission surface and disposed between the end and the outer edge, a series of first cascading surfaces spaced from one another and extending from the end to the outer edge, and a series of second surfaces each disposed between an adjacent pair of first cascading surfaces and connecting such pair of first cascading surfaces together, wherein the series of first cascading surfaces and second surfaces define at least one of the emission surface and the third surface. The waveguide redirection element receives the light from the LED light source and redirects the light into a second pattern out of the emission surface onto the reflective surface such that the second pattern illuminates a first area and the LED light source occupies a second area smaller than the first area.

Also disclosed is a lighting system that comprises a support element having a reflective surface and an LED light engine mounted on the support element. The LED light engine comprises an LED light source that provides light in a first pattern and a waveguide element that receives the light from the LED light source and redirects the light into a second pattern onto a portion of the reflective surface laterally spaced from the waveguide element, wherein the waveguide element comprises an inner portion and an outer portion having an emission surface disposed adjacent and at an oblique angle with respect to the inner portion. The outer portion of the waveguide element comprises an end having a first thickness adapted to receive light, an outer edge opposite the end having a second thickness less than the first thickness, and a third surface opposite the emission surface and disposed between the end and the outer edge. The outer portion further comprises a series of first cascading surfaces spaced from one another and extending from the end to the outer edge and a series of second surfaces each disposed between an adjacent pair of first cascading surfaces and connecting such pair of first cascading surfaces together, wherein the series of first cascading surfaces and second surfaces define the emission surface.

BRIEF DESCRIPTION OF THE DRAWINGS

FIG. 11A is an isometric view showing a top view of a dropped-ceiling and an embodiment of a dropped-ceiling lighting system.

FIG. 11B is an isometric showing a bottom view of an embodiment of a dropped-ceiling lighting system FIG. 11C is a side view of an embodiment of a dropped-ceiling lighting system.

FIG. 11D is a bottom view of an embodiment of a dropped-ceiling lighting.

DETAILED DESCRIPTION OF THE INVENTION

Figure 1A:
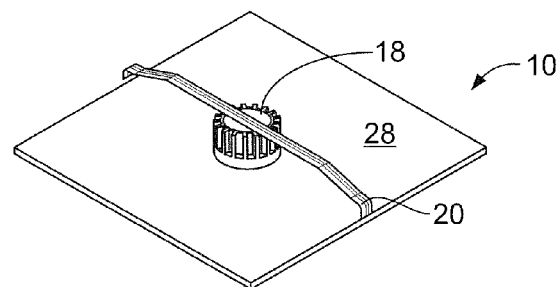
FIG. 1A is an isometric view showing a top side of an embodiment of a dropped-ceiling lighting system.
Figure 1B:
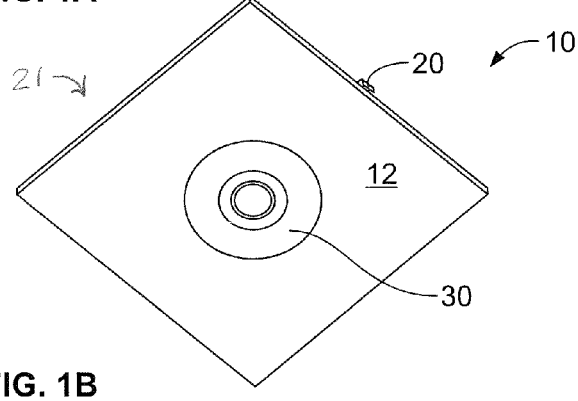
FIG. 1B is an isometric view showing a bottom side view of an embodiment of a dropped-ceiling lighting system.

FIGS. 1-13E disclosed is a lighting system 10 comprised of a support element 21 having a reflective surface 12 and a luminaire 18 mounted on the support element 21. The luminaire 18 includes a light emitting diode ("LED") light source 24 that provides light in a first pattern, and a redirection element 26 that receives the light from the LED light source 24 and redirects the light into a second pattern onto the reflective surface 12, wherein the reflective surface 12 occupies a first area, the LED light source 24 occupies a second area, and the first area is greater than the second area, as shown in FIGS. 13A-13E.

In an embodiment, when seen from below, the first area occupied by the reflective surface 12 is about 46 times greater than the second area occupied by the LED light source 24. In one particular version, the LED light source 24 occupies an area approximately 4 inches in diameter.

In still another embodiment, the LED light source 24 is positioned to direct incident light initially downward with respect to the reflective surface 12. In another embodiment, the LED light source 24 directs incident light initially in an upward direction relative to the reflective surface 12, while in still another embodiment, the LED light source 24 directs incident light initially at an angle of about 90° with respect to the reflective surface 12. In one embodiment, the light source 24 may emit light in a circular pattern, while in a second embodiment, the light source 24 emits light in a linear pattern.

In an embodiment, the light is emitted from the light source 24 and is reflected from the reflector 12 in a luminance per unit maximum to minimum ratio of about 1:1 to about 3:1 over the surface of the reflector 12. In another embodiment, the light is reflected from the reflector 12 in a ratio of about 1.5:1 to about 2.5:1. In a more particular embodiment, the light is reflected from the reflector in a ratio of about 2.0 to about 1.0.

In one embodiment, the reflective surface 12 is diffuse. It may also be on a ceiling. The reflective surface 12 may be smooth or textured depending upon how one wants to control how light redirects off the reflective surface 12 and into space.

Also disclosed, in FIGS. 1A-5D and FIGS. 8A-8D is a lighting system 10, comprising a reflective surface 12, an LED light engine 18 comprising at least one LED 24 and a waveguide 30 that receives the light generated from said at least one LED 24 and directs the light from an emission surface 31 towards the reflective surface 12, as shown in, for example, FIGS. 1C, 2C, 12A and 12D. In an embodiment, the LED light engine 18 is adjacent to the reflective surface 12, while the emission surface 31 is spaced from said reflective surface 12 and adapted to direct light uniformly across at least a portion of the reflective surface 12 laterally spaced from said LED light engine 18 at an incident angle of no greater than about 10° from the emission surface 31 to the end of the reflective surface 12.

In another embodiment, the incident angle is less than about 8°, while is still another embodiment, the incident angle is between about 3° and about 8°. In a more particular embodiment, the incident angle is about 5°. Similar incident angles may occur in an embodiment using a reflective optical assembly as opposed to a waveguide 30 as a redirection element 26, as discussed below.

The reflective surface 12 may be diffuse. It may also be designed to shine light down into an area to be illuminated. The reflective surface 12 may be smooth or textured depending upon how one wants to control how light redirects off the reflective surface 12 and into space. While the reflective surface 12 is designed to shine light into an area, the distribution of the light may be changed by changing the specularity versus diffusion of the reflective surface 12, and by adding textured surfaces onto the reflective surface 12. In addition to controlling how light illuminates a space, such features also affect the appearance of the reflective surface 12.

The reflective surface 12 may be on a ceiling or on a support member 20 for the LED light engine 18 and may be rigid enough to support its own weight below a ceiling tile, but may also use the LED light engine 18 for support. The reflective surface 12 may also be a ceiling barrier that supports its own weight and may use the ceiling supports for additional strength.

In an embodiment, the waveguide 30 generally defines a plane, and the plane of the waveguide 30 is generally parallel to the plane of the reflective surface 12. In still another embodiment, the LED light engine 18 is supported by a support member 20 and the reflective surface 12 is a surface of the supporting member of the reflective surface. In yet another embodiment, the reflective surface 12 is positioned in an opening in a grid used to suspend a dropped ceiling.

The waveguide 30 may be adapted to direct all of the light generated from the LED light source 24 onto the reflective surface 12. Likewise, the waveguide 30 may also be directed to direct most of the light generated from the LED light source 24 onto the reflective surface 12. In one embodiment, the emission surface 31 angles away from the reflective surface 12, as shown for example in FIGS. 1C and 2C.

In an embodiment, the LED light engine 18 comprises a reflector 26. In still another embodiment, the waveguide 30 comprises a reflector 26 opposite the reflective surface 12. In a particular version of such embodiment, the reflective surface 12 has a first area and the LED light source 24 has a second area that is smaller than the first area. In a more particular embodiment, the first area is 12 times greater than the second area. The LED light engine 18 may be located adjacent to yet spaced apart from said reflective surface 12. In still another embodiment, the support element 21 may be adapted to fit in a modular ceiling system.

Also disclosed is a lighting system kit 10 comprising a support element 21 having a reflective surface 12 and an LED light engine 18 mounted on the support element 21. The LED light engine 18 includes an LED light source 24 that provides light in a first pattern, and a waveguide element 30 that receives the light from the LED light source 24 and redirects the light into a second pattern onto a portion of the reflective surface 12 laterally space from the waveguide element 30.

In an embodiment, the reflective surface 12 is diffuse. In another embodiment, the light shines downward from the reflective surface 12 into an area to be illuminated. In still another embodiment, the reflective surface 12 is on a ceiling. The reflective surface 12 may also be on a support member for the LED light engine 18.

In another embodiment, the waveguide 30 generally defines a plane and the plane of the waveguide 30 is generally parallel to the plane of the reflective surface 12. The LED light engine 18 may be supported by a support member, and the reflective surface 12 is a surface of the supporting member of the reflective surface 12. The reflective surface 12 may also be positioned in an opening in a grid used to suspend a dropped ceiling.

In the kit 10, the waveguide 30 may be adapted to direct all of the light generated from the LED light source 24 onto the reflective surface 12. In another embodiment, the waveguide 30 is directed to direct most of the light generated from the LED light source 24 onto the reflective surface 12. In still another embodiment, the emission surface 31 angles away from the reflective surface 12.

In another embodiment, the LED light engine 18 comprises a reflector 26. In still another embodiment, the waveguide 30 comprises a reflector 26 opposite the reflective surface 12. In a particular version of such embodiment, the reflective surface 12 has a first area and the LED light source 24 has a second area that is smaller than the first area. In a more particular embodiment, the first area is 12 times greater than the second area. The LED light engine 18 may be located adjacent to yet spaced apart from said reflective surface 12. In yet another embodiment, the reflective surface 12 is positioned in an opening in a grid used to suspend a dropped ceiling.

FIGS. 1-11D show a dropped-ceiling lighting system 10 that is comprised of a reflector 12 positioned in an opening in a grid 16 used to suspend a dropped ceiling 14. A lighting device 18 including a light source 24 is mounted adjacent to the reflector 12. The light source 24 provides light in a first pattern, and a redirection element 26 receives light from the light source 24 and redirects the light into a second pattern onto the reflector 12. A structural support 20 secures the lighting device 18 to the grid 16 independent of the reflector 12. A power source 22 supplies power for the lighting device 18.

Figure 6A:
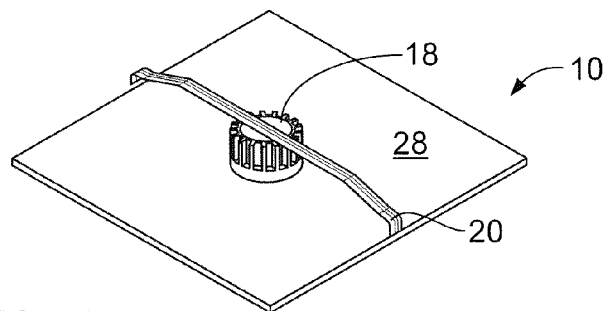
FIG. 6A is an isometric view showing a top side of an embodiment of a dropped-ceiling lighting system.
Figure 6B:
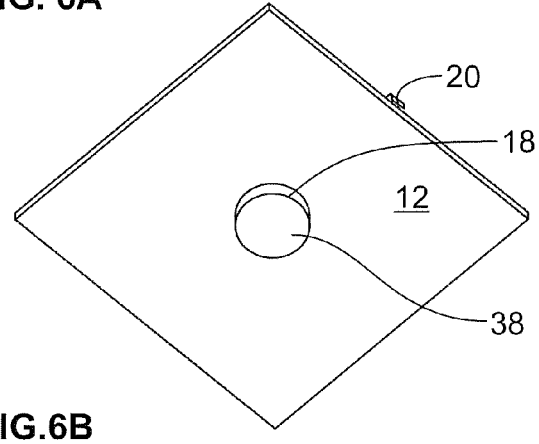
FIG. 6B is an isometric view showing a bottom side view of an embodiment of a dropped-ceiling lighting system.
Figure 6C:
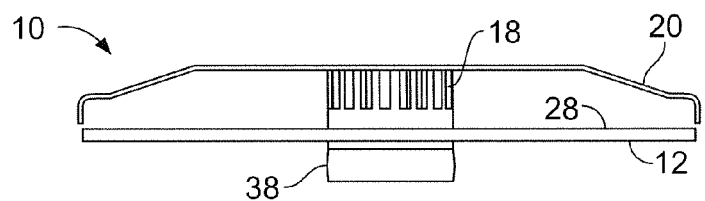
FIG. 6C is a side view of an embodiment of a dropped-ceiling lighting system.
Figure 6D:
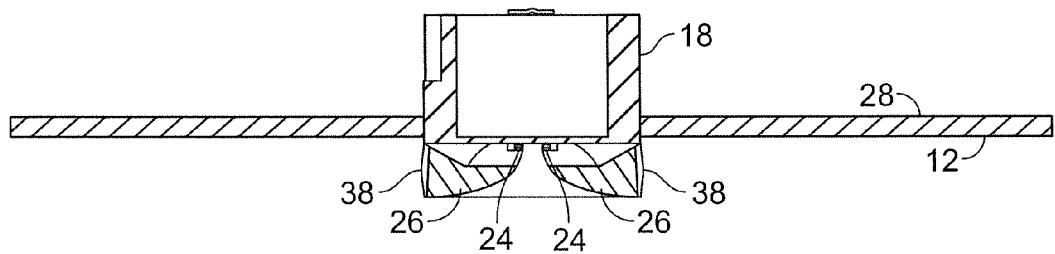
FIG. 6D is a sectional view of a plenum barrier showing an embodiment of a dropped-ceiling lighting system with a lighting device positioned in the barrier and having a light source oriented in a position away from the reflector.
Figure 7A:
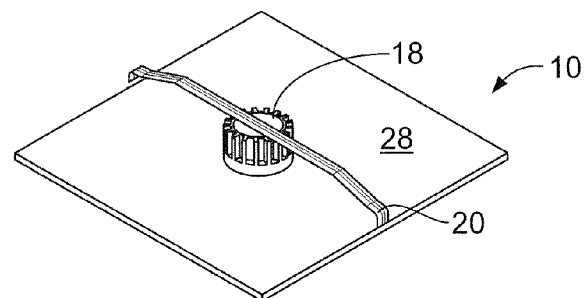
FIG. 7A is an isometric view showing a top side of an embodiment of a dropped-ceiling lighting system.
Figure 7B:
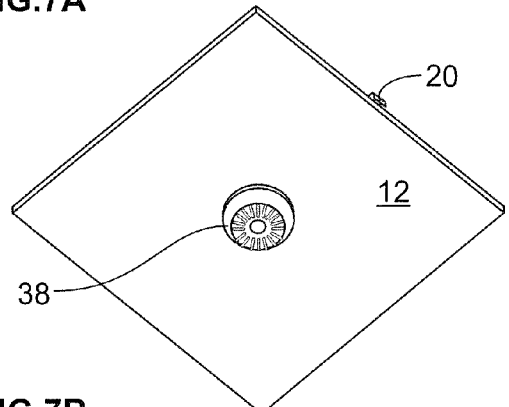
FIG. 7B is an isometric view showing a bottom side view of an embodiment of a dropped-ceiling lighting system.
Figure 7C:
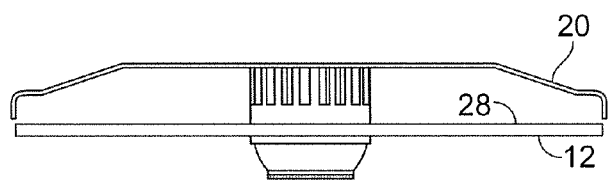
FIG. 7C is a side view of an embodiment of a dropped-ceiling lighting system.
Figure 7D:
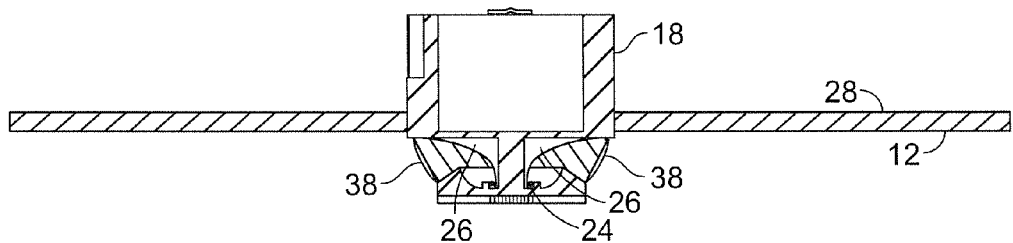
FIG. 7D is a sectional view of a plenum barrier showing an embodiment of a dropped-ceiling lighting system with a lighting device positioned in the barrier and having a light source oriented in a position toward the reflector.
Figure 8A:
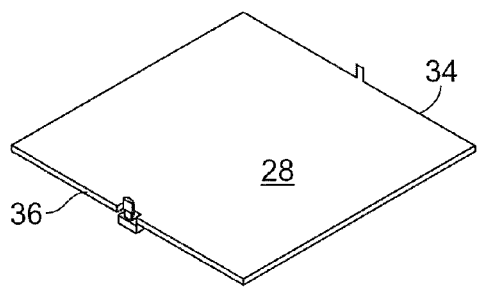
FIG. 8A is an isometric view showing a top side of an embodiment of a dropped-ceiling lighting system.
Figure 8B:
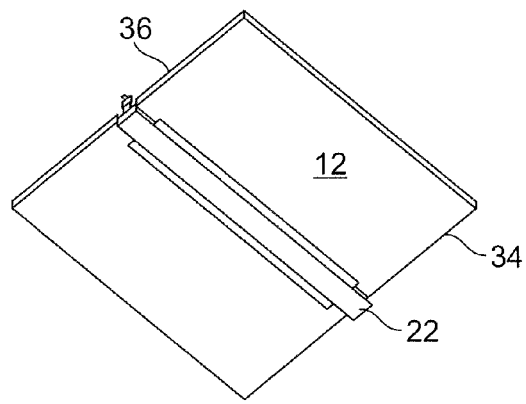
FIG. 8B is an isometric view showing a bottom side view of an embodiment of a dropped-ceiling lighting system having a linear power source and a waveguide adjacent to the light source.
Figure 8E:
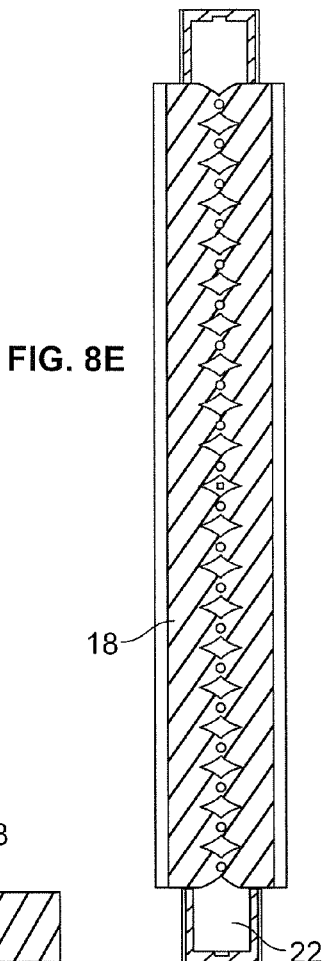
FIG. 8E is a cross-section of the lighting device shown in FIG. 8B.
Figure 8C:
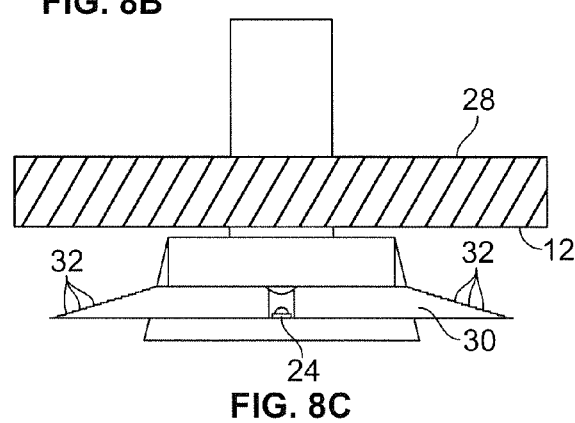
FIG. 8C is a sectional view of a plenum barrier showing another embodiment of a dropped-ceiling lighting system with a lighting device positioned along the bottom side of the barrier and having a light source adjacent to a waveguide and oriented in a position away from the reflector.
Figure 8D:
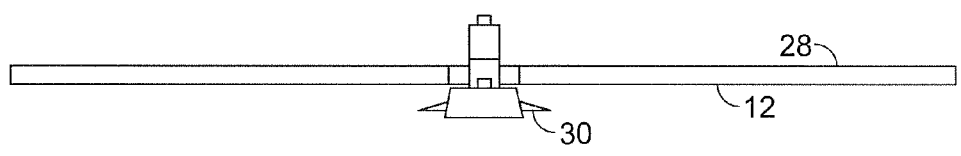
FIG. 8D is a side view of an embodiment of a dropped-ceiling lighting system.
Figure 9A:
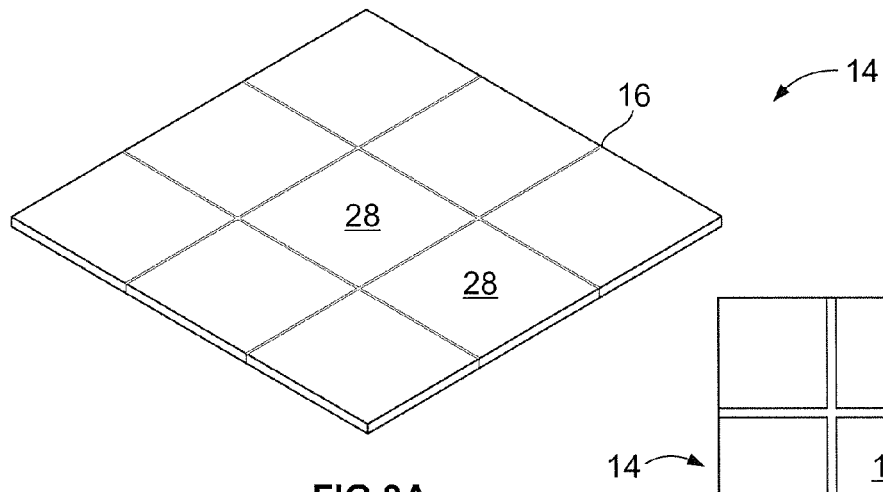
FIG. 9A is an isometric view showing a top side of a dropped-ceiling.
Figure 9D:
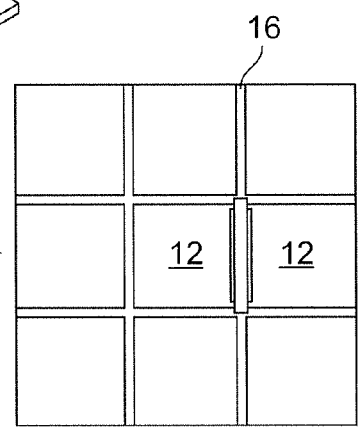
FIG. 9D is a bottom view of an embodiment of a dropped-ceiling lighting system with a lighting device secured to a portion of a ceiling grid.
Figure 9C:
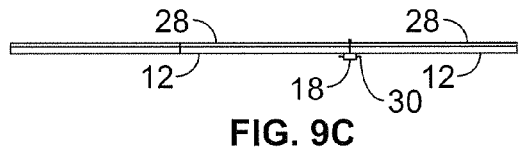
FIG. 9C is a side view of an embodiment of a dropped-ceiling lighting system secured to a portion of a ceiling grid.
Figure 9B:
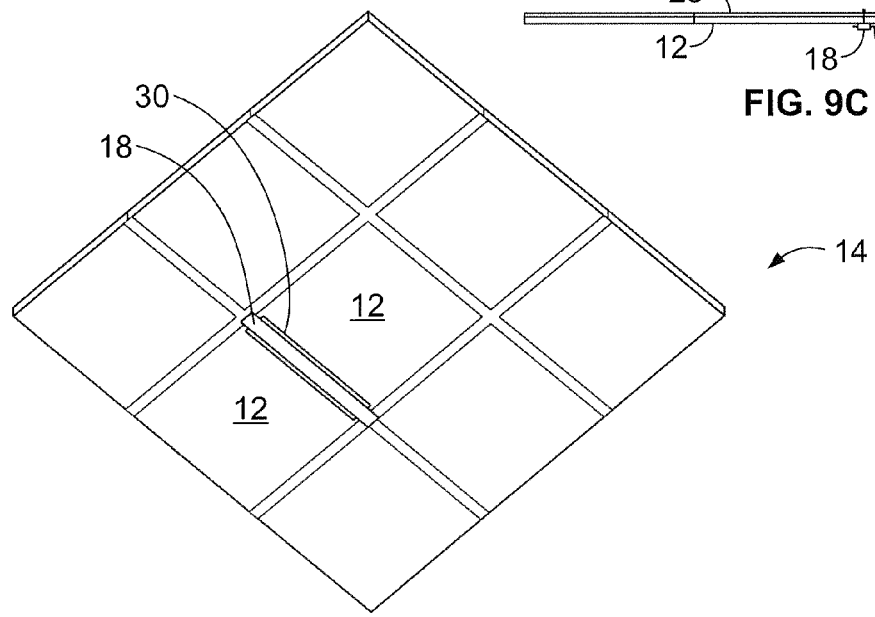
FIG. 9B is an isometric showing a bottom side view of an embodiment of a dropped-ceiling lighting system secured to a portion of a ceiling grid between two tiles or plenum barriers.

In an embodiment, as shown in FIGS. 6D, 7D, and 8D, the redirection element 26 may be an optical reflector that is positioned adjacent to the light source 24. In another embodiment, the power source 22 is remotely located within the dropped ceiling 14.

In still another embodiment, as shown in FIGS. 1-11D, the reflector 12 is attached to a plenum barrier 28 such as a ceiling tile that spans the opening in the grid. In another version of this embodiment, the plenum barrier 28 defines an opening and the lighting device 18 is mounted in the opening, as shown in FIGS. 1-7. In a more particular version of the embodiment, the lighting device 18 is mounted flush with the plenum barrier 28.

In an embodiment, the light source 24 is a light emitting diode ("LED"). In one version of the embodiment, the light source 24 is oriented away from the reflector 12, as shown, for example, in FIGS. 1D, 4D, and 6D. In a second version of the embodiment, the light source 24 is oriented toward the reflector 12, as in FIGS. 7D and 8D, while in a third version of the embodiment, the light source 24 is oriented parallel to the reflector 12 as, for example, in FIG. 5D.

Figure 1C:
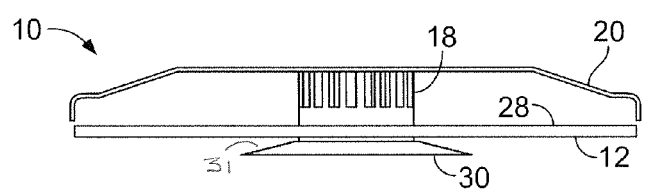
FIG. 1C is a side view of an embodiment of a dropped-ceiling lighting system.
Figure 1D:
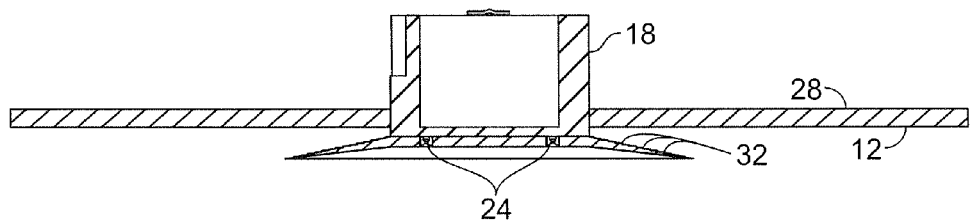
FIG. 1D is a sectional view of a plenum barrier showing an embodiment of a dropped-ceiling lighting system with a lighting device positioned in the barrier and having a light source oriented in a position away from the reflector.
Figure 2A:
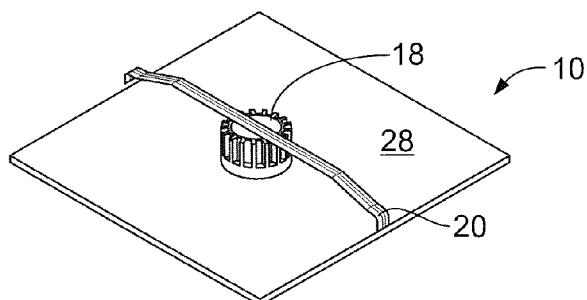
FIG. 2A is an isometric view showing a top side of a second embodiment of a dropped-ceiling lighting system.
Figure 2B:
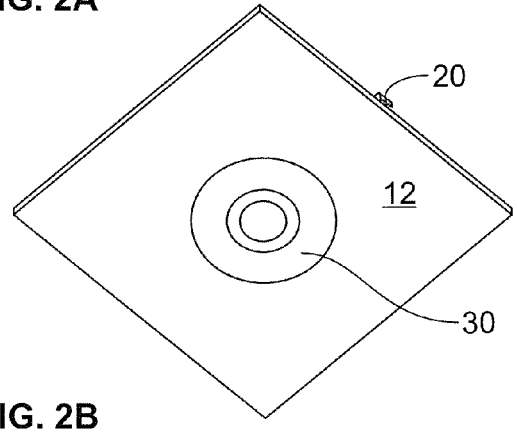
FIG. 2B is an isometric view showing a bottom side of a second embodiment of a dropped-ceiling lighting system.
Figure 2C:
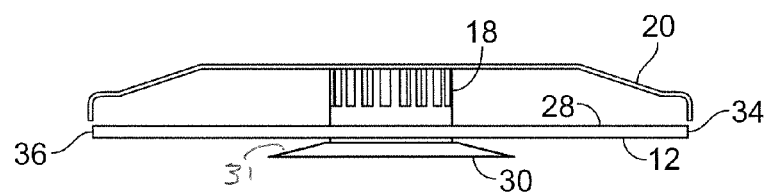
FIG. 2C is a side view of a second embodiment of a dropped-ceiling lighting system.
Figure 2D:
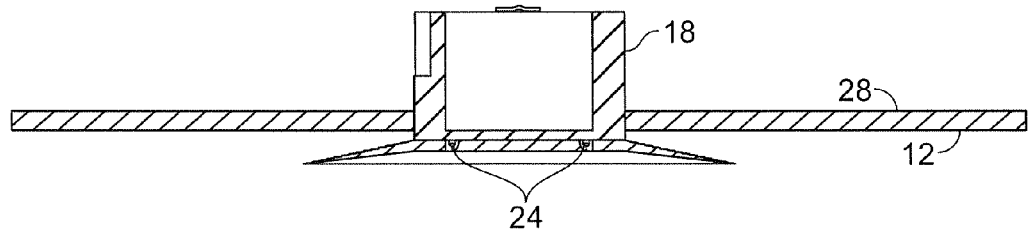
FIG. 2D is a sectional view of a plenum barrier showing a second embodiment of a dropped-ceiling lighting system with a lighting device positioned in the barrier and having a light source oriented in a position parallel to the reflector.
Figure 3A:
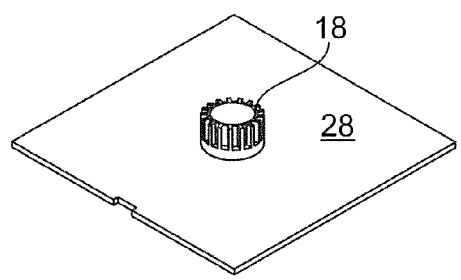
FIG. 3A is an isometric view showing a top side of another embodiment of a dropped-ceiling lighting system.
Figure 3E:
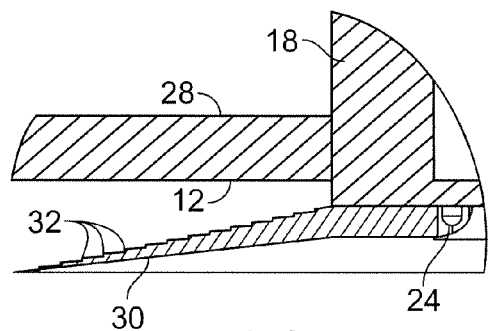
FIG. 3E is an enlarged view of the area identified by line 3E in FIG. 3D.
Figure 3B:
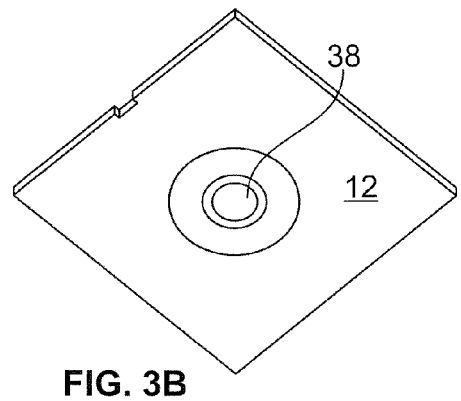
FIG. 3B is an isometric view showing a bottom side view of another embodiment of a dropped-ceiling lighting system having a waveguide adjacent to the light source.
Figure 3F:
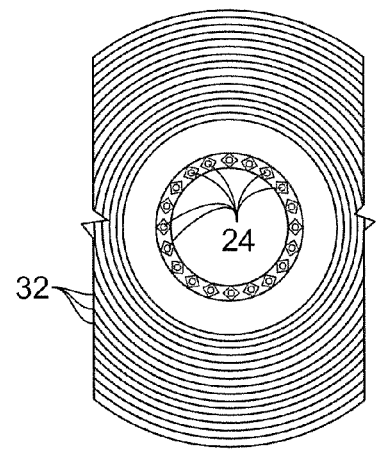
FIG. 3F is a sectional view showing a light source oriented downward from the reflector and a portion of the waveguide.
Figure 3C:
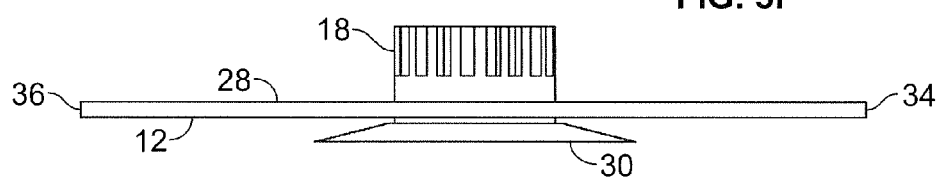
FIG. 3C is a side view of another embodiment of a dropped-ceiling lighting system having a waveguide adjacent to the light source.
Figure 3D:
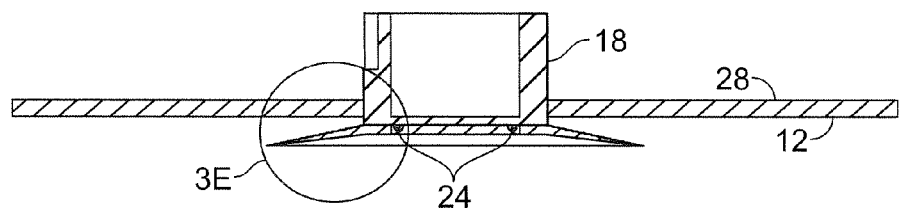
FIG. 3D is a sectional view of a plenum barrier showing another embodiment of a dropped-ceiling lighting system with a lighting device positioned in the barrier and having a light source adjacent to a waveguide and oriented in a position away from the reflector.
Figure 4A:
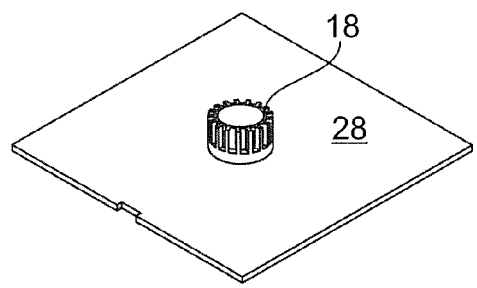
FIG. 4A is an isometric view showing a top side of another embodiment of a dropped-ceiling lighting system.
Figure 4B:
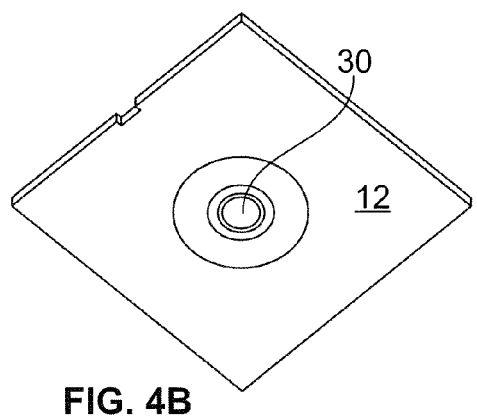
FIG. 4B is an isometric view showing a bottom side view of another embodiment of a dropped-ceiling lighting system having a waveguide adjacent to the light source.
Figure 4E:
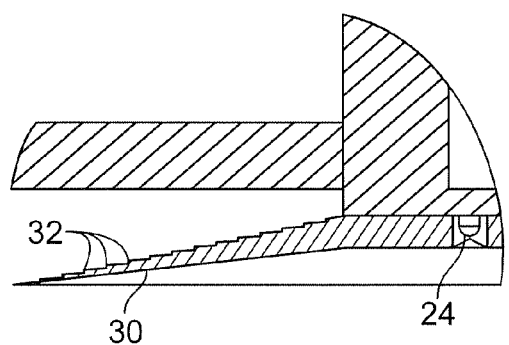
FIG. 4E is an enlarged view of the area identified by line 4E in FIG. 4D.
Figure 4F:
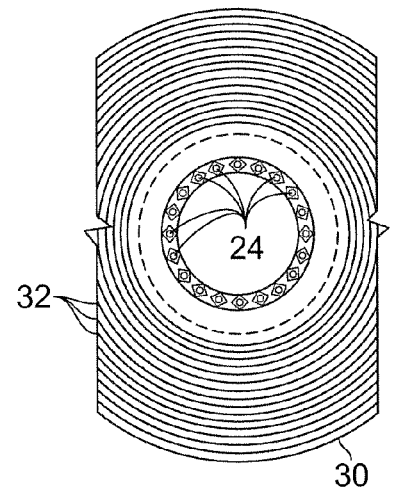
FIG. 4F is a sectional view showing a light source oriented downward from the reflector and a portion of the waveguide.
Figure 4C:
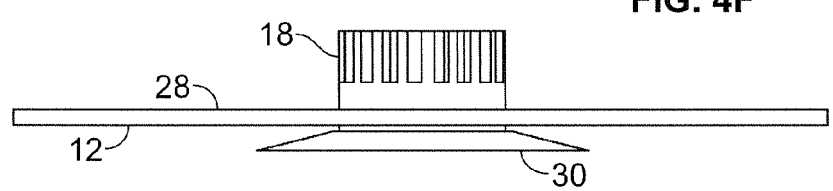
FIG. 4C is a side view of another embodiment of a dropped-ceiling lighting system having a waveguide adjacent to the light source.
Figure 4D:
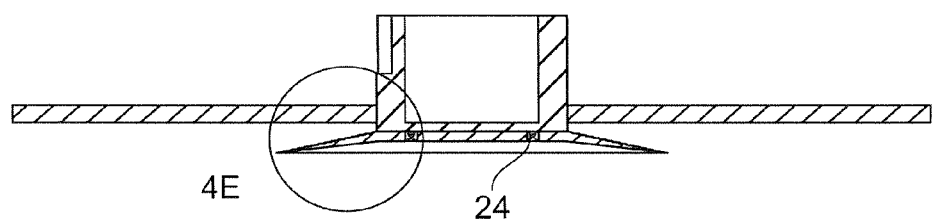
FIG. 4D is a sectional view of a plenum barrier showing another embodiment of a dropped-ceiling lighting system with a lighting device positioned in the barrier and having a light source adjacent to a waveguide and oriented in a position away from the reflector.
Figure 5A:
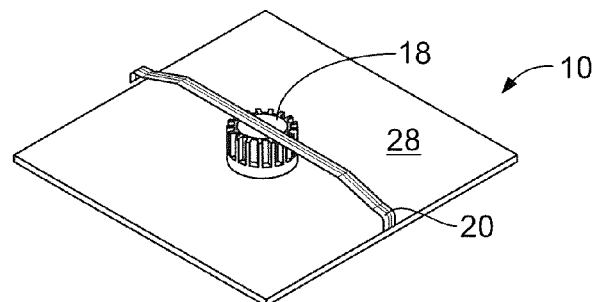
FIG. 5A is an isometric view showing a top side of another embodiment of a dropped-ceiling lighting system.
Figure 5B:
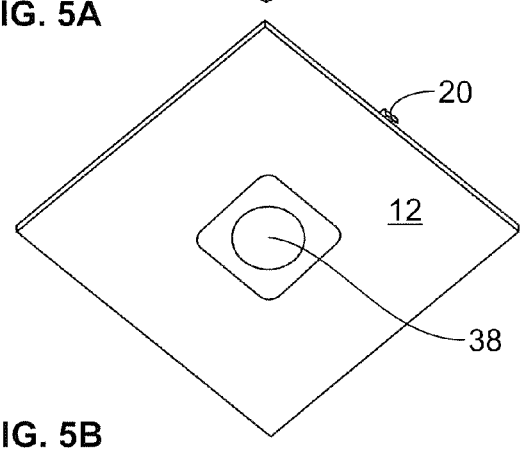
FIG. 5B is an isometric view showing a bottom side view of another embodiment of a dropped-ceiling lighting system.
Figure 5C:
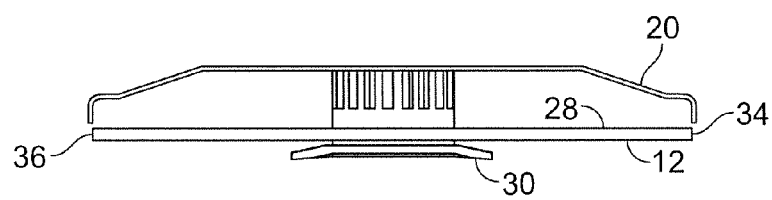
FIG. 5C is a side view of another embodiment of a dropped-ceiling lighting system.
Figure 5D:
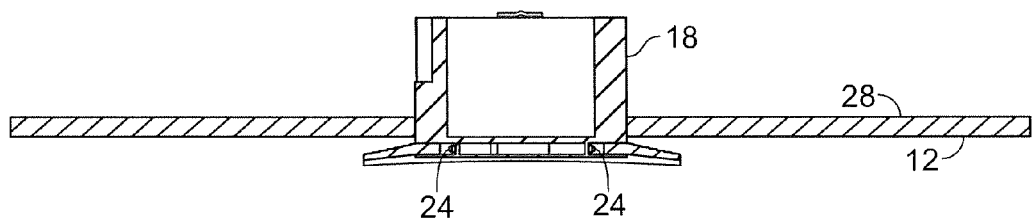
FIG. 5D is a sectional view of a plenum barrier showing another embodiment of a dropped-ceiling lighting system with a lighting device positioned in the barrier and having a light source adjacent to a waveguide and oriented in a direction parallel to the reflector
Figure 12A:
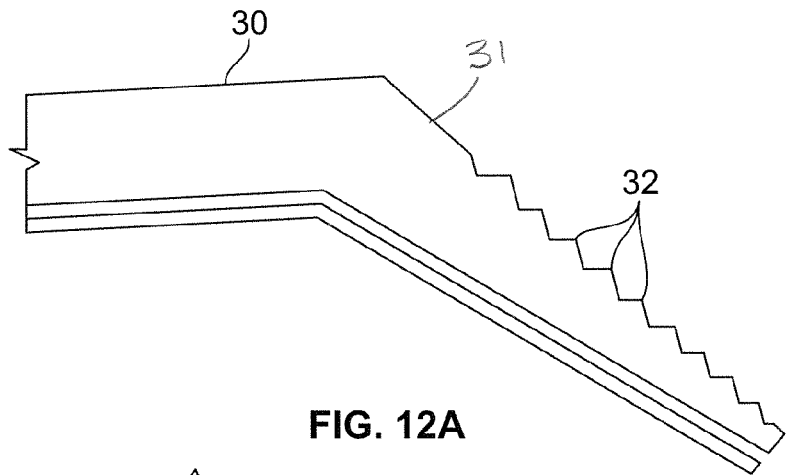
FIG. 12A is a partial view showing an embodiment of a waveguide and the extrusions on the waveguide.
Figure 12B:
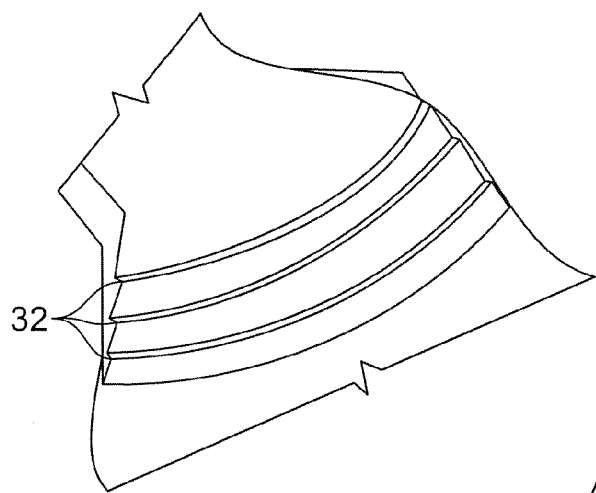
FIG. 12B is a partial view showing another embodiment of a waveguide and the extrusions on the waveguide.
Figure 12C:
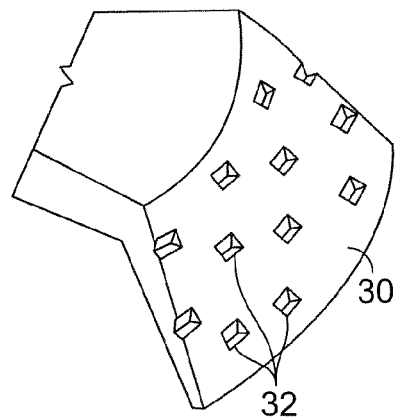
FIG. 12C is a partial view showing yet another embodiment of a waveguide and the extrusions on the waveguide.

Depending on the orientation of the light source 24, a waveguide 30 may be positioned adjacent to the light source 24, as is shown in FIGS. 1C and D, 2C and D, 3C and D, 4C and D, and 5C and D. The waveguide 30 may be comprised of a thin body of acrylic having multiple extraction features 32, as shown in FIGS. 12A-C. Light from the light source 24 bounces through the waveguide 30 until it strikes one of the multiple extraction features 32 and is redirected.

In still another embodiment, the reflector 12 may be a substrate. In yet another embodiment, the reflector 12 is a coating painted on the plenum barrier 28.

Figure 10A:
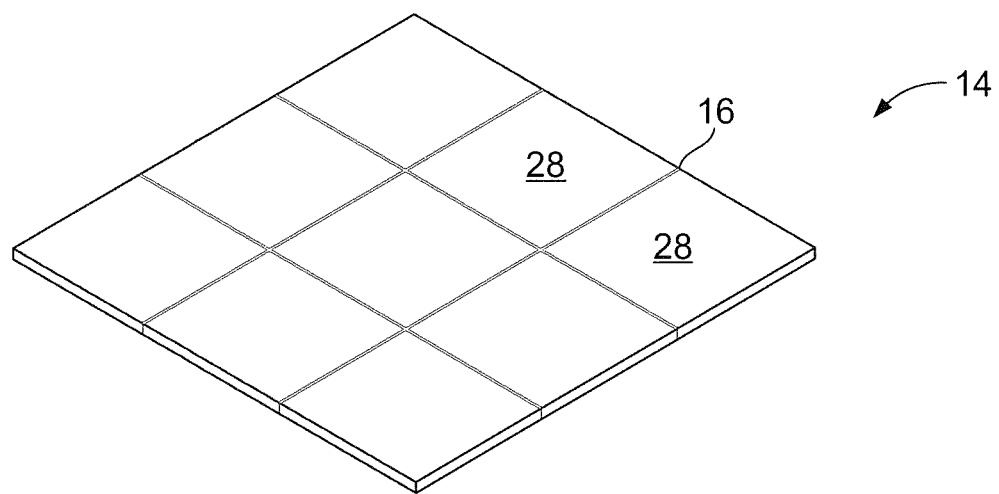
FIG. 10A is an isometric view showing a top side of a dropped-ceiling.
Figure 10B:
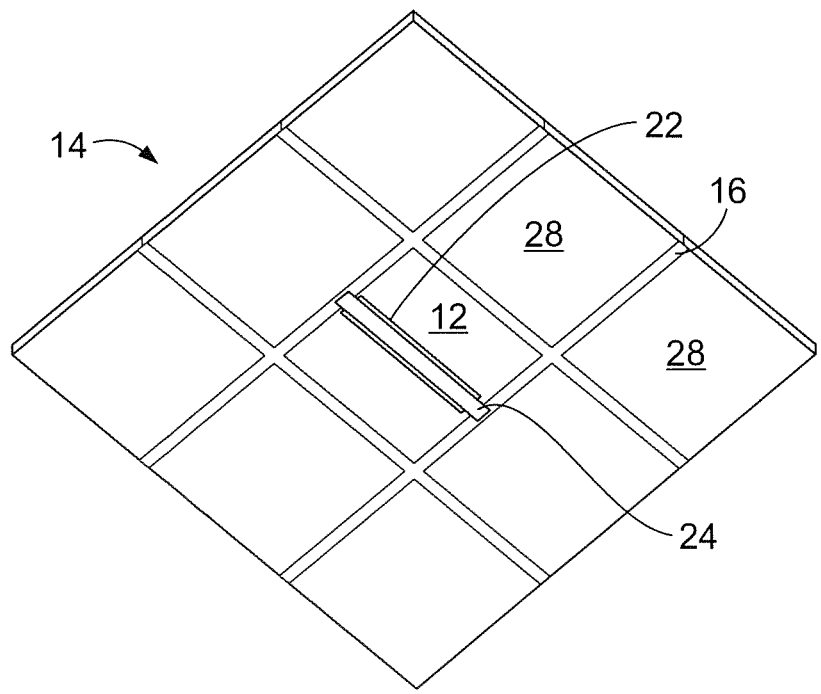
FIG. 10B is an isometric showing a bottom side view of an embodiment of a dropped-ceiling lighting system secured to a portion of a ceiling grid between two tiles or plenum barriers.

Also disclosed is a dropped-ceiling lighting system 10 comprised of a reflector 12 attached to a plenum barrier 28 such as a ceiling tile positioned in an opening in a grid 16 used to suspend a dropped ceiling 14. A power source 22 extends from a first edge 34 of the plenum barrier 28 to a second edge 36 of the plenum barrier 28, as shown in FIGS. 8-10, and a light source 24 is mounted to the power source 22.

In an embodiment, the power source 22 is mounted so as to extend along a portion of the ceiling grid 16 between adjacent ceiling tiles, as shown in FIG. 9A-D. In another embodiment, as shown in FIG. 8E, a linear array having a plurality of light sources 24 extends along the power source 22 and light generated by each of the plurality of light sources 24 is directed into a solid volume of acrylic.

In another embodiment, the reflector 12 is a substrate. The reflector 12 may also be a coating that is painted on the plenum barrier 28. In all of the embodiments discussed above, the light source 24 may be an LED.

When in operation, power is transmitted to the lighting device 18 from the power source 22. In one embodiment, the lighting device 18 (e.g., LEDs) emits light either downward from the ceiling, upward toward the ceiling, or outward from the center of the lighting system in a direction parallel to the ceiling tile. The emitted light radiates through an optical reflector 26 and lens 38 before entering a space or room to be illuminated where it then reflects off of the reflector 12 so as to light the space.

The appearance of the light will be guided by the shape of the light source but can be controlled by changing the geometry of the optics. The design results in a constant output of light being directed to different orientations on the troffer. This allows one to avoid high brightness areas in favor of low brightness so as to reduce glare.

Figure 12D:
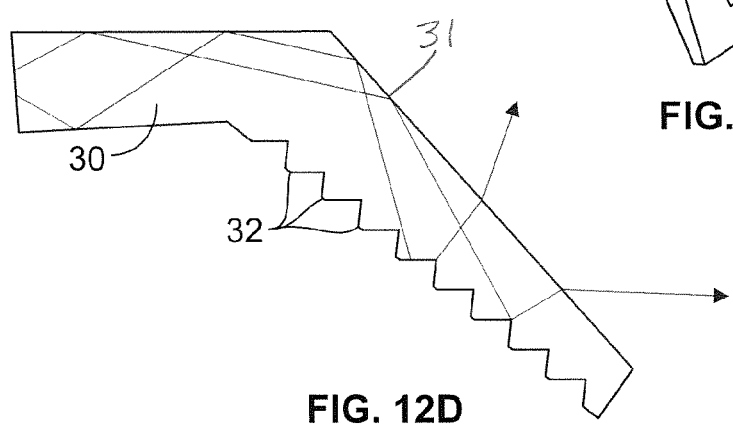
FIG. 12D is a partial view showing another embodiment of a waveguide and the extrusions on the waveguide.

In an embodiment, the light emitted from the LEDs is directed into a waveguide 30 made of a thin body of an acrylic-like substance. As shown in FIG. 12A, the light repeatedly bounces through the shaped acrylic body by total internal reflection until it strikes an extraction feature and is redirected into the body or escapes into the space or room to be illuminated where it then reflects off of the reflector 12 at a relatively high angle (e.g., 70°) with respect to a vertical axis of the lighting fixture, thereby lighting the space. In one embodiment, as shown in FIG. 12A, facets may be placed on the exiting surface, where they use refraction to extract the light. In another embodiment, as shown in FIG. 12D, facets may be placed opposite the exiting surface, where they use total internal reflection, then refraction, to extract light. The light bounces through the shaped acrylic body until it strikes an extraction feature and is redirected into the body or escapes. The full array of facets creates a controllable distribution of light out of the guide. The waveguide 30 may include a diffuser, and/or a reflector mounted below an exposed portion of the waveguide 30. This is to control the appearance of the guide 30 and to provide for additional control of the extracted light.

In yet another embodiment, a long, thin lighting device 18 runs from a first edge 34 to a second edge 36 of the reflector 12 where it fastens directly to the ceiling grid, as shown in FIGS. 8A-E. A linear array of light sources 24 runs along the lighting device 18 and directs its output into waveguide 30 made of a solid volume of acrylic-like material. Light emitted from the light sources 24 travels through the acrylic until striking an extraction feature and redirecting out of the optic where it is reflected off of the reflector 12, thereby lighting the space or room as desired. In a particular version of this embodiment, the electrical driver is mounted remotely above the ceiling plane and supplies power to the engine. The lighting device 18 can be mounted so that it runs across the ceiling tile, or so that it runs along the ceiling grid between tiles, as shown in FIGS. 9A-D. The waveguide 30 may include a diffuser, and/or a reflector mounted below an exposed portion of the waveguide 30. This is to control the appearance of the guide 30 and to provide for additional control of the extracted light.

Figure 13A:
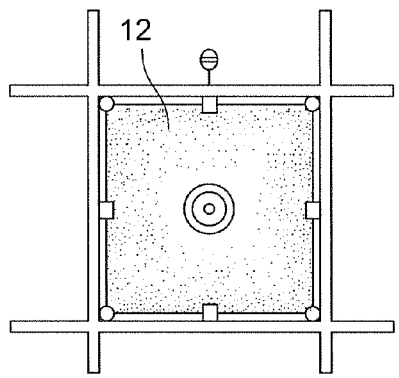
FIG. 13A shows the light distribution resulting from an embodiment utilizing a radial design of a lighting fixture.
Figure 13B:
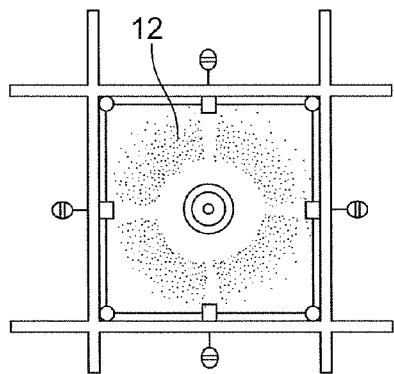
FIG. 13B shows the light distribution resulting from a second embodiment utilizing a radial design of a lighting fixture.
Figure 13C:
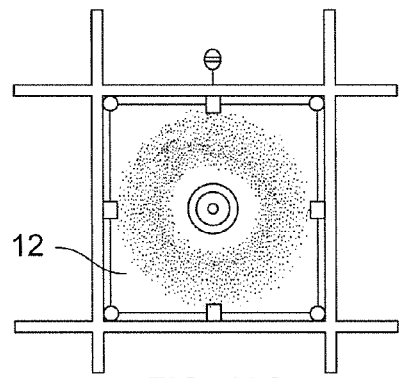
FIG. 13C shows the light distribution resulting from still another embodiment utilizing a radial design of a lighting fixture.
Figure 13D:
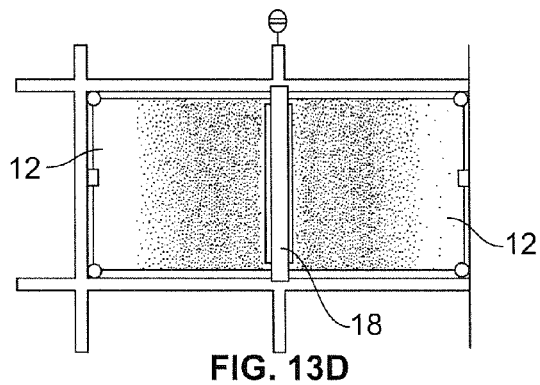
FIG. 13D shows the light distribution resulting from an embodiment utilizing a linear design of a light fixture.
Figure 13E:
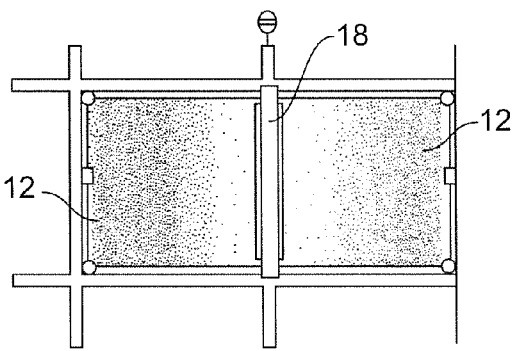
FIG. 13E shows the light distribution resulting from a second embodiment utilizing another linear design of a light fixture.

Depending on whether a radial or linear light fixture is utilized, the light may be distributed in a manner shown in FIGS. 13A-E. FIGS. 13A-C shows the distribution of light across a reflector when using a radial design while FIGS. 13D-E shows the light distribution resulting from a linear design.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A lighting system, comprising:
   a support element having a reflective surface; and
   a luminaire mounted on the support element, said luminaire comprising
   an LED light source that provides light in a first pattern, and
   a waveguide redirection element comprising an inner portion and an outer portion having an emission surface disposed adjacent and at an oblique angle with respect to the inner portion, the outer portion comprising
   an end having a first thickness adapted to receive light and an outer edge opposite the end having a second thickness less than the first thickness;
   a third surface opposite the emission surface and disposed between the end and the outer edge;
   a series of first cascading surfaces spaced from one another and extending from the end to the outer edge; and
   a series of second surfaces each disposed between an adjacent pair of first cascading surfaces and connecting such pair of first cascading surfaces together, wherein the series of first cascading surfaces and second surfaces define at least one of the emission surface and the third surface, wherein the waveguide redirection element receives the light from the LED light source and redirects the light into a second pattern out of the emission surface onto the reflective surface such that the second pattern illuminates a first area and the LED light source occupies a second area smaller than the first area.

2. The lighting system of claim 1, wherein the first area illuminated by the second pattern is 12 times greater than the second area occupied by the LED light source.

3. The lighting system of claim 1, wherein the LED light source occupies an area approximately 4 inches in diameter.

4. The lighting system of claim 1, wherein the LED light source provides light in a direction downward from the reflective surface.

5. The lighting system of claim 1, wherein the LED light source provides light in an upward direction toward the reflective surface.

6. The lighting system of claim 1, wherein the LED light source provides light at an angle less than 90° with respect to the reflective surface.

7. The lighting system of claim 1, wherein the light source emits light in a circular pattern.

8. The lighting system of claim 1, wherein the light source emits light in a linear pattern.

9. The lighting system of claim 1, wherein the light is emitted from the light source and reflected from the reflective surface in a luminance per unit maximum to minimum ratio of about 1:1 to about 3:1 over the reflective surface.

10. The lighting system of claim 1, wherein the light is emitted from the light source and reflected from the reflective surface in a luminance per unit maximum to minimum ratio of about 1.5:1 to about 2.5:1 over the reflective surface.

11. The lighting system of claim 1, wherein the light is emitted from the light source and reflected from the reflective surface in a luminance per unit maximum to minimum ratio of about 2.0:1.0 over the reflective surface.

12. The lighting system of claim 1, wherein the reflective surface is diffuse.

13. The lighting system of claim 1, wherein the reflective surface is on a ceiling.

14. The lighting system of claim 1, wherein the support element is adapted to fit in a modular ceiling system.

15. A lighting system, comprising:
    a support element having a reflective surface; and
    an LED light engine mounted on the support element comprising
    an LED light source that provides light in a first pattern, and
    a waveguide element that receives the light from the LED light source and redirects the light into a second pattern onto a portion of the reflective surface laterally spaced from the waveguide element, wherein the waveguide element comprises an inner portion and an outer portion having an emission surface disposed adjacent and at an oblique angle with respect to the inner portion, the outer portion comprises:
    an end having a first thickness adapted to receive light and an outer edge opposite the end having a second thickness less than the first thickness,
    a third surface opposite the emission surface and disposed between the end and the outer edge;
    a series of first cascading surfaces spaced from one another and extending from the end to the outer edge;
    a series of second surfaces each disposed between an adjacent pair of first cascading surfaces and connecting such pair of first cascading surfaces together, wherein the series of first cascading surfaces and second surfaces define the emission surface.

16. The lighting system of claim 15, wherein the reflective surface is diffuse.

17. The lighting system of claim 15, wherein the light shines downward from the reflective surface into an area to be illuminated.

18. The lighting system of claim 15, wherein the reflective surface is on a ceiling.

19. The lighting system of claim 15, wherein the reflective surface is on a support member for the LED light engine.

20. The lighting system of claim 15, wherein the waveguide generally defines a plane and the plane of the waveguide is generally parallel to the plane of the reflective surface.

21. The lighting system of claim 15, wherein:
the LED light engine is supported by a support member; and
the reflective surface is a surface of the supporting member of the reflective surface.

22. The lighting system of claim 15, wherein the reflective surface is positioned in an opening in a grid used to suspend a dropped ceiling.

23. The lighting system of claim 15, wherein the waveguide is adapted to direct all of the light generated from said one LED light source onto the reflective surface.

24. The lighting system of claim 15, wherein the waveguide is directed to direct most of the light generated from said one LED light source onto the reflective surface.

25. The lighting system of claim 15, wherein the emission surface angles away from the reflective surface.

26. The lighting system of claim 15, wherein the LED light engine comprises a reflector.

27. The lighting system of claim 15, wherein the waveguide comprises a reflector opposite the reflective surface.

28. The lighting system of claim 15, wherein:
the second pattern illuminates a first area;
said one LED light source occupies a second area; and
the first area is greater than the second area.

29. The lighting system of claim 28, wherein the first area is 12 times greater than the second area.

30. The lighting system of claim 15, wherein the LED light engine is adjacent to yet spaced apart from said reflective surface.

31. The lighting system of claim 15, wherein the support element is adapted to fit in a modular ceiling system.

* * * * *